May 12, 1959
R. D. LIVINGSTON
2,885,920
LATHE WITH AUXILIARY BEARING SUPPORT
Filed March 26, 1958
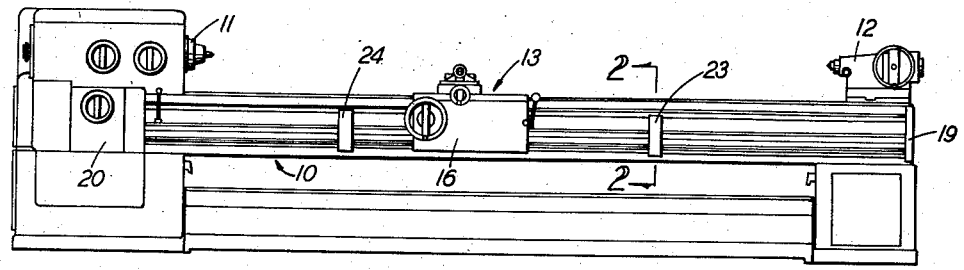
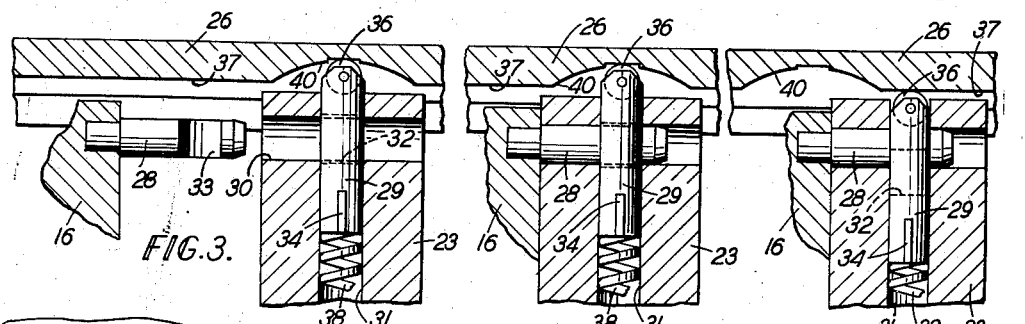
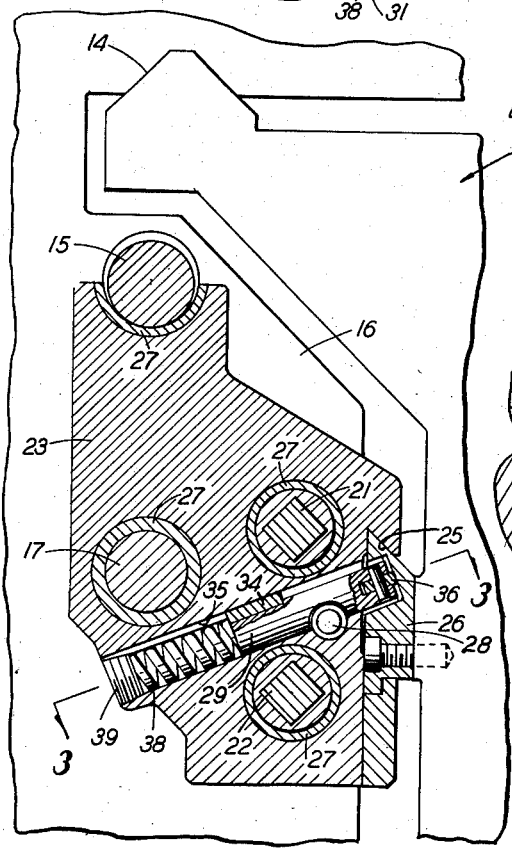
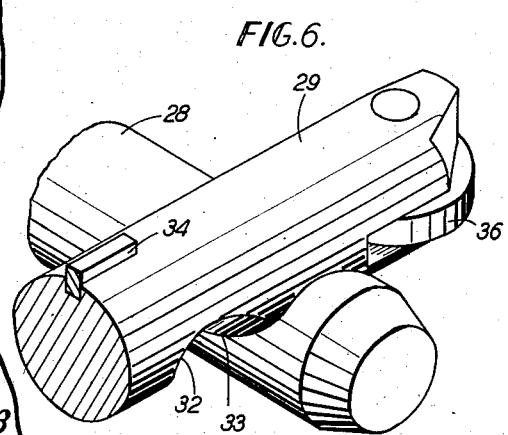
INVENTOR.
RICHARD D. LIVINGSTON
BY
ATTORNEYS United States Patent Office 2,885,920
Patented May 12, 1959

2,885,920

LATHE WITH AUXILIARY BEARING SUPPORT

Richard D. Livingston, Rockford, Ill., assignor to Barber-Colman Company, Rockford, Ill., a corporation of Illinois Application March 26, 1958, Serial No. 724,086

3 Claims. (Cl. 82—21)

This invention relates to lathes and particularly to lathes with comparatively long beds. In such a lathe, the feed rod, the lead screw and similar shafts are relatively long and tend to sag with the result that their bearings wear unduly and the quality of the work produced on the lathe often is affected.

The general object of the invention is to provide in a lathe of the above character a novel auxiliary bearing for the shaft elements which bearing supports these elements intermediate their ends without interfering with the normal advance of the tool carriage of the lathe and which requires no manual operation on the part of the person using the lathe.

A more detailed object is to arrange the bearing and the carriage to coact so that, in one direction of advance of the carriage, the latter moves the bearing out of the way while the carriage also automatically returns the bearing to its original or normal position when the carriage moves in the opposite direction.

The invention also resides in the novel construction and coaction of locking elements which connect and disconnect the bearing to the carriage to produce the foregoing movement of the bearing.

Other objects and advantages of the invention will become apparent from the following detailed description taken in connection with the accompanying drawings, in which Figure 1 is a front view of a lathe incorporating the novel auxiliary bearing supports of the present invention.

Fig. 2 is an enlarged fragmentary sectional view taken along the line 2—2 of Fig. 1.

Fig. 3 is a fragmentary sectional view taken along the line 3—3 in Fig. 2.

Figs. 4 and 5 are views similar to Fig. 3 but show the parts in moved positions.

Fig. 6 is an enlarged fragmentary perspective view of the locking elements.

As shown in the drawings for purposes of illustration, the invention is shown in the drawings as embodied lathe comprising an elongated horizontal bed 10 which supports at one end a head stock 11 and at the other end a tail stock 12 to mount the work. A conventional tool carriage 13 slides from one end to the other on a way 14 (Fig. 2) formed on the bed and is advanced along the way either by the usual lead screw 15, which is threaded through an apron 16 depending from the upper portion of the tool carriage, or by a feed rod 17. At the tail stock end of the lathe, the screw 15 and rod 17 are journaled in bearings as indicated at 19 and at the opposite end, they are journaled in and connected to the drive head 20 of the lathe. Paralleling the screw and rod are square shafts 21 and 22 which control the conventional clutch and brake (not shown) and the high speed reverse control respectively.

In lathes which have comparatively long beds 10, there is a tendency for the screw 15, the rod 17 and the shafts 21 and 22 to sag. As a result, these parts wobble increasing the wear on their respective bearings and, in some instances affecting the quality of the work. To overcome these difficulties, the present invention contemplates the provision of one or more auxiliary bearing members, there being two herein indicated at 23 and 24 which support these shaft elements 15, 17, 21 and 22 intermediate their ends to prevent sagging and which cooperate in a novel manner with the tool carriage 13 so that they automatically are moved out of the way of the carriage as the latter is advanced along the bed as well as being returned automatically to their original positions when the carriage is reversed.

Herein, the bearing members 23 and 24 are in the form of blocks and are disposed on opposite sides of the tool carriage 13 with one normally being located about one-third the distance from the head stock 11 to the tail stock 12 and the other similarly spaced from the tail stock. As shown in Fig. 2, each block is formed on its inner side with a way 25 which mates with an elongated horizontal bar 26 bolted to the bed 10 so that the block is supported by and is free to slide along the bed. Bearings 27 on the block receive the screw 15, the rod 17 and the shafts 21 and 22 so that, through the medium of the block, these members are supported intermediate their ends on the bed.

With the foregoing arrangement, the blocks 23 and 24 normally are located as shown in Fig. 1. As the tool carriage 13 is moved along the bed 10, for example to the right, it abuts against the block 23 and pushes the latter along the bed with the carriage. In order to return the block to its original position when the carriage is moved in the opposite direction, the carriage and the block respectively carry elements 28 and 29 which interengage when the carriage abuts the block. As the carriage slides the block along the bed, these elements interlock and they remain interlocked so that the block also moves back with the carriage. When the block reaches its original position, the elements automatically disengage with the result that the block remains in this position as the carriage moves away.

In the present instance, the element 28 is a pin rigid with and projecting laterally from the side of the apron 16 to enter a horizontal hole 30 (Fig. 3) in the block 23. The other element 29 also is a pin slidably disposed in a vertical bore 31 which is formed in the block and intersects the hole 30. A curved notch 32 (Fig. 6) in the pin 29 normally is alined with the hole 30 so that the pin 28 may enter the hole completely, that is, at may cross the pin 29 as shown in Fig. 4. A similar notch 33 formed in the pin 28 is alined with the bore 31 when this pin has fully entered the hole and this permits the pin 29 to be slid back in the bore (see Figs. 5 and 6) thus interlocking the pins. A key 34 on the pin 29 slides in a keyway 35 (Fig. 2) in the bore 31 to keep the pin from turning so that the notch 33 always is properly oriented relative to the hole 30.

Cam means is provided to slide the pin 29 back in the bore 31 and interlock the two pins 28 and 29 automatically as the block 23 is moved away from its normal position. Herein, this means comprises a follower roller 36 pinned on one end of the pin 29, which projects out beyond the block, and engaging a cam surface 37 on the bar 26, the follower being urged into engagement with the cam surface by a compression spring 38. The latter is disposed within the bore 31 and acts between the inner end of the pin 29 and a plug 39 (Fig. 2) closing the adjacent end of the bore.

As illustrated in Figs. 3, 4 and 5, the cam surface 37 has a concave recess 40 cut in the bar 26 at the normal position of the block 23. When the block is in that position, the follower engages the center of the cam surface and the notch 32 is aligned with the hole 30. As the block is moved, the follower rides back along the incline of the cam surface and this retracts the pin 29. A similar arrangement (not shown) is provided in connection with the block 24.

In using a lathe having the supporting blocks 23 and 24, the tool carriage 13 may, for example, be near the center of the bed 10 as shown in Fig. 1 in which case both blocks are in their normal positions. Should the carriage be advancing to the right, the pin 28 will approach the hole 30 as illustrated in Fig. 3 and will enter the hole (Fig. 4) in the continued movement of the carriage. Such entry is permitted since the follower 36 is at the center of the cam recess 40 so that the notch 32 is alined with the hole 30. When the side of the apron 16 abuts the block 23, that is, when the pin 28 is fully inserted in the hole 30, further advance of the carriage pushes the block to the right. As a result, the follower 36 rides out of the cam recess (Fig. 5) retracting the pin 29.

With the pin 29 retracted, the notch 32 no longer is alined with the hole 30 and the pin 28, therefore, is locked in the hole by the pin 29. Thus, upon return movement of the carriage 13, the block 23 is pulled back until the follower 36 reenters the recess 40. The latter permits the spring 38 to project the pin 29 so that the notch 32 again is alined with the hole 30. This, in effect, unlocks the block 23 from the carriage 13 whereupon the block remains stationary as the carriage moves further to the left. Should the carriage move far enough to the left, the block 24 would be moved out of and back into its normal position in the same manner.

It will be seen that the blocks 23 and 24 support the screw 15, the rod 17 and the shafts 21 and 22 to keep these parts from sagging. At the same time, the blocks do not interfere with the carriage movement since they automatically are moved ahead of the carriage when circumstances require it. Moreover, the blocks do not have to be repositioned manually. Instead, they are automatically returned to their normal positions by the novel interaction of the pins 28 and 29.

I claim as my invention:

1. In a lathe, the combination of, an elongated bed, a tool carriage slidable along said bed, an elongated rod extending along said bed and connected to said carriage, power operated means for turning said rod thereby to move said carriage back and forth along said bed, bearings at opposite ends of said bed rotatably supporting said rod, an auxiliary bearing member slidable along said bed and supporting said rod between said carriage and one of said end bearings, said bearing member normally being disposed in a predetermined position along the bed and adapted for abutment with said carriage so as to be pushed thereby along the bed, a pin mounted on said member to slide transversely of the bed between a projected position and a retracted position, a part rigid with said carriage and projected into said member when the carriage abuts the member, said part being locked to the member by said pin when the latter is in said retracted position, an elongated cam surface rigid with and extending along said bed, and a follower mounted on said pin and engaging said cam surface, said cam surface having a portion opposite the normal position of said member operable to move said pin to the projected position when the member is in said normal position, said surface being operable in the initial movement of the member out of said normal position to retract said pin thereby to couple the member to the carriage and to project the pin when said member returns to the normal position thereby to uncouple the member from the carriage.

2. In a lathe, the combination of, an elongated bed, a tool carriage slidable along said bed, an elongated rod extending along said bed and connected to said carriage, power operated means for turning said rod thereby to move said carriage back and forth along said bed, bearings at opposite ends of said bed rotatably supporting said rod, an auxiliary bearing member slidable along said bed and supporting said rod between said carriage and one of said end bearings, said bearing member normally being disposed in a predetermined position along the bed and adapted for abutment with said carriage so as to be pushed thereby along the bed, a pin mounted on said bearing member to slide back and forth between first and second positions and disposed in said first position when the member is in its normal position, a part rigid with said carriage and projecting into said member when the carriage abuts the member, said part being locked to the member by said pin when the latter is in said second position, cam means operable in the initial movement of said member out of said normal position to slide said pin to said second position thereby to couple the bearing member to the carriage, said bearing member when coupled to the carriage being pulled reversely by the carriage, and means operable when said member is returned to said normal position to slide said pin to said first position to release said part whereby the member remains in said normal position upon the continued reverse movement of the carriage.

3. In a lathe, the combination of, an elongated bed, a tool carriage slidable along said bed, an elongated feed member extending along said bed and connected to said carriage to move the latter back and forth in accordance with the turning of the member, bearings at opposite ends of said bed rotatably supporting said member, an auxiliary bearing member slidable along said bed and supporting said feed member between said carriage and one of said end bearings, said bearing member being normally disposed in a predetermined position along the bed and adapted for abutment with said carriage so as to be pushed thereby along said bed, interengageable first and second elements mounted on said carriage and bearing member respectively and brought into interengaging relation as said carriage comes into abutment with said bearing member, and cam means on said bed operable in the initial movement of said bearing member by said carriage out of said normal position to interlock said elements thereby to couple the bearing member to the carriage, said bearing member when said elements are thus coupled being pulled reversely by said carriage, said elements being uncoupled by said cam means when said bearing member is returned to said normal position.

No references cited.